United States Patent Office 2,943,511
Patented July 5, 1960

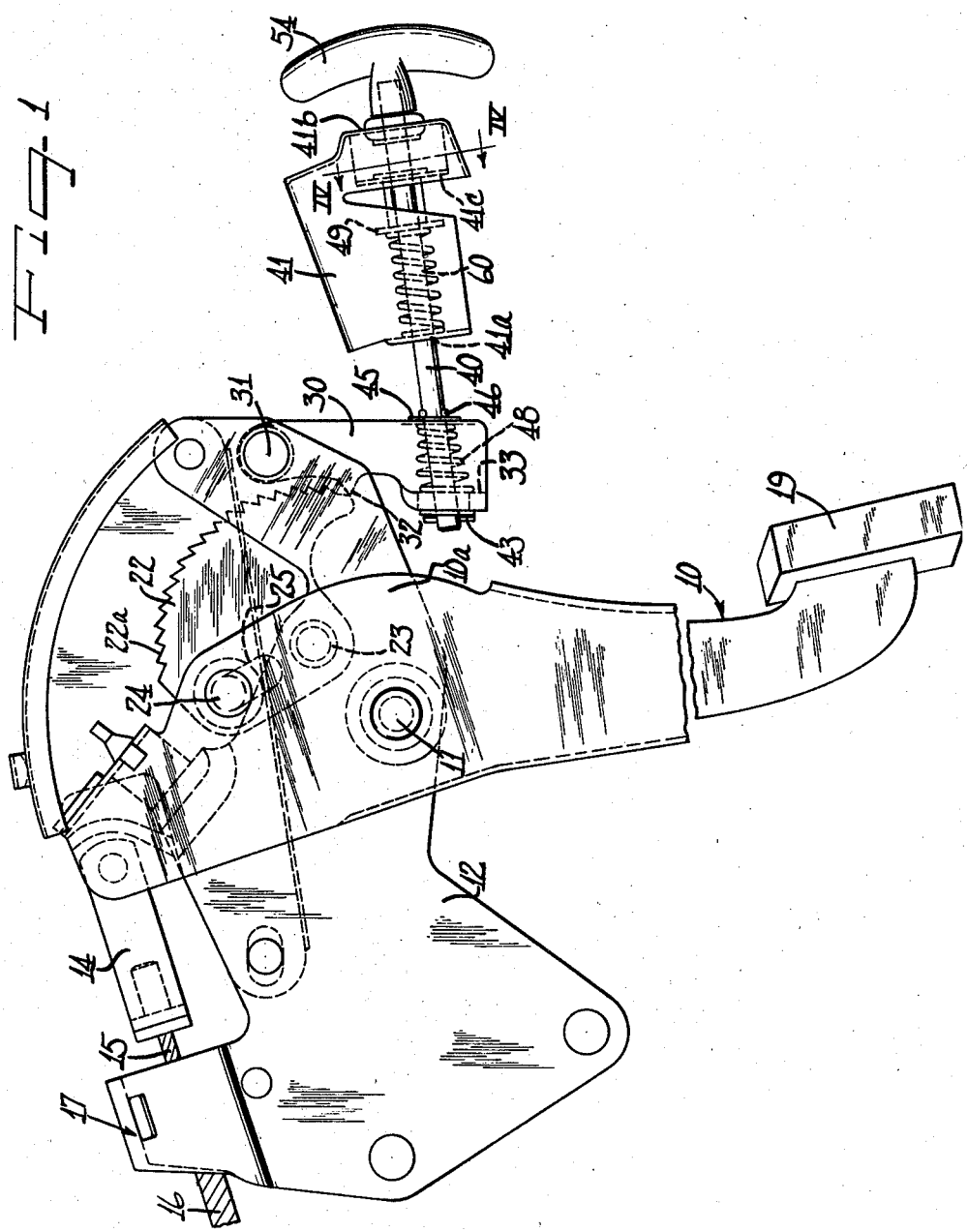

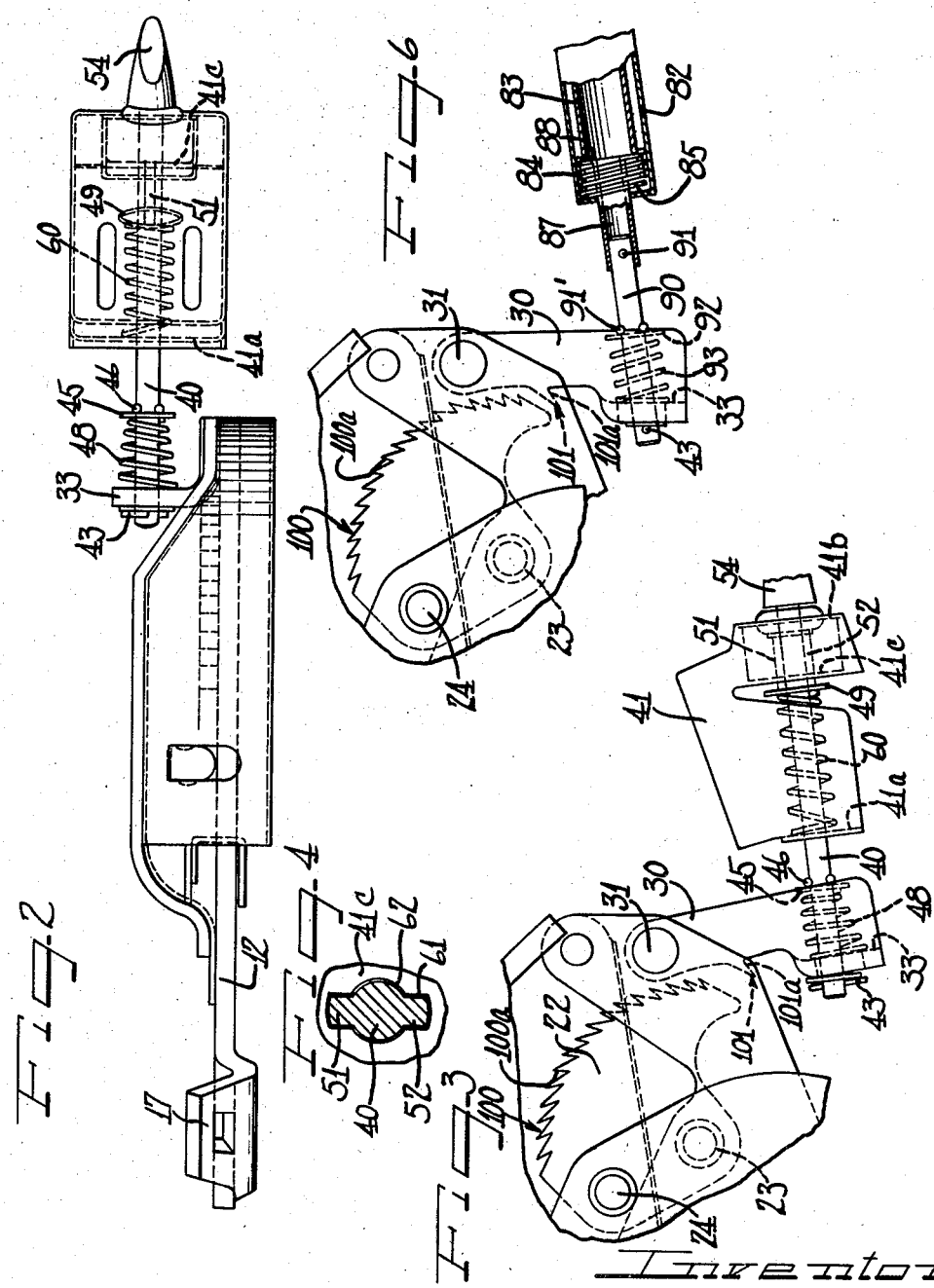

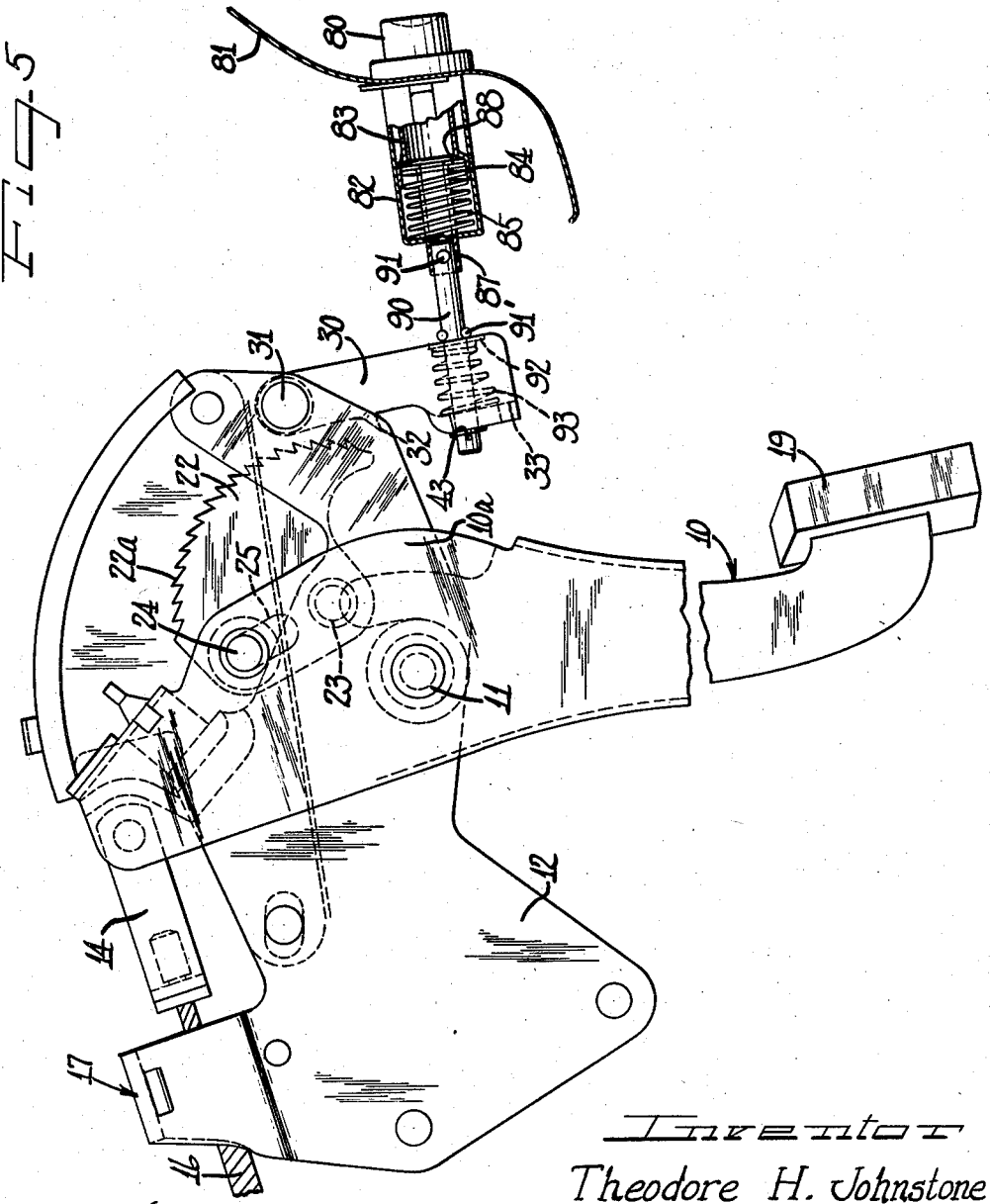

2,943,511

PARKING BRAKE ASSEMBLY

Theodore H. Johnstone, Detroit, Mich., assignor, by mesne assignments, to The Bingham-Herbrand Corporation, a corporation of Ohio Filed Nov. 25, 1955, Ser. No. 549,054

8 Claims. (Cl. 74—529)

This invention relates to a brake lever assembly, and particularly to such an assembly which is adapted to combined use as an emergency and parking brake for a vehicle.

It is an important object of the present invention to provide a novel and improved foot operated brake lever assembly.

It is a further important object of the present invention to provide a foot operated brake lever assembly having means for retaining the brake lever in a brake setting condition, and wherein the brake lever retaining means is normally inactive thereby facilitating the use of the brake lever assembly as an emergency brake.

It is another object of the present invention to provide a novel hand controlled release mechanism for a foot operated brake lever assembly.

Yet another object of the present invention is to provide a foot operated brake lever assembly utilizing a hand or foot release control requiring a minimum of operating space.

In accordance with one of the embodiments of the present invention, there is provided a foot operated brake lever assembly having ratchet sector and pawl means for retaining the brakes in an attained brake setting condition, and having a hand operated rod biased to a condition maintaining the pawl and ratchet sector out of engagement, but being capable of retention in a second position requiring engagement between the pawl and ratchet means during operation of the assembly as a parking brake.

It is a further object of the present invention to provide a foot operated parking brake assembly having a release mechanism which can be released with relatively little effort by the operator.

In accordance with a further embodiment of the present invention there is provided a foot operated brake lever assembly wherein ratchet and pawl means are normally in disengaged relation so that the brake lever assembly may be used as an emergency brake but where a push button may be depressed to place the ratchet and pawl means in engageable relation, frictional forces between the ratchet and pawl means being relied upon to maintain the engaged relation after release of the push button, and the brakes being released by pressing on the foot pedal of the brake lever assembly.

Another object of the present invention is to provide a novel ratchet and pawl means for a foot operated brake lever.

Other objects, features and advantages of the present invention will be apparent from the following detailed description taken in connection with the accompanying drawings, in which:

On the drawings:

Figure 1 is a fragmentary side elevational view and illustrates a first form of foot operated brake lever assembly in accordance with the present invention;

Figure 2 is a fragmentary top plan view of the structure of Figure 1;

Figure 3 is a fragmentary side elevational view of a portion of the structure of Figure 1 but illustrating the ratchet and pawl means in normal disengaged relation;

Figure 4 is a cross sectional view taken generally along the line of IV—IV of Figure 1;

Figure 5 is a fragmentary side elevational view of a second embodiment of brake lever assembly in accordance with the present invention with certain parts broken away and in section, and Figure 6 is a fragmentary side elevational view similar to Figure 5 but illustrating the ratchet and pawl means in engageable relation for operation as a parking brake.

As shown on the drawings:

Referring to Figures 1 through 4, it will be observed that the brake lever assembly therein illustrated comprises a foot operated lever arm 10 which is pivotally mounted by means of a rivet 11 to a bracket 12 and is connected at its upper end to a link 14 secured to brake actuating cable 15. The cable housing 16 may be clamped to the bracket 12 by means of a mechanism indicated at 17. Thus, as foot pedal 19 is depressed, the brake cable 15 is retracted to transmit a brake setting force.

When the assembly is to be used as a parking brake, it is of course required that the brakes be retained in the desired brake setting condition after the operator has released the foot pedal 19. To this end, ratchet and pawl means are provided for retaining the lever arm 10 in successive incremental brake setting positions, this retaining means including a ratchet sector 22 pivotally connected at 23 to the bracket 12 and coupled to the brake lever arm 10 by means of a pin 24 extending through a circular aperture in the side walls such as 10a of the brake lever arm 10 and through an elongated slot 25 extending radially of the pivot 23 in the ratchet sector 22. Thus, as the brake lever 10 is pivoted about the rivet 11, the ratchet sector 22 is caused to move therewith arcuately about the pivot 23 while the pin 24 travels in the slot 25 to accommodate the relative movement between the brake lever and the ratchet sector radially of the pivot 23.

Cooperating with the ratchet sector in maintaining the brake lever in attained brake setting positions is a pawl member 30 pivotally mounted at 31 to the bracket 12 and having a tooth 32 of configuration to cooperate with the ratchet teeth 22a on the ratchet sector 22. The pawl 30 has a right angle flange 33 which provides a means for attachment to the hand operated release mechanism to be hereinafter described for normally maintaining the pawl tooth 32 out of engageable relation to the ratchet teeth 22a and for moving the tooth into engageable relation to the ratchet teeth as shown in Figure 1 when it is desired to operate the assembly as a parking brake.

The hand release mechanism for controlling the pawl 30 comprises an elongated rod 40 which may be mounted by means of a bracket 41 to the instrument panel or related structure of a motor vehicle. The bracket 41 provides walls 41a and 41b having circular apertures for guiding axial and rotary movement of the rod 40. At its forward end the rod is coupled to the flange 33 as illustrated in Figure 2 by extending through an aperture therein and having a suitable pin means 43 preventing rearward movement of the rod 40 relative to the flange 33. For urging the flange 33 to move with the rod 40 in the forward direction, a collar 45 is locked to the rod 40 by means of a suitable ring 46 and a compression spring 48 is disposed between the washer 45 and the flange 33. Spring means 60 is bottomed against the wall 41a and acts on a collar 49 secured against rearward movement on the rod 40 to urge the rod 40 into a rearward position. To retain the rod 40 in a forward position against the action of the spring 60, the bracket 41 provides a further flange portion 41c having a pair of radial slots 61 extending from a central aperture 62 closely receiving the rod 40, and the rod 40 has a pair of radial splines 51 and 52 for extension in these radial slots of the flange 41c.

In operation of the embodiment of Figures 1 to 4, to set the brakes, the rod 40 is moved forwardly until the rear ends of the splines 51 and 52 clear the wall 41c, after which the handle 54 is twisted to move the splines 51 and 52 out of alignment with the corresponding radial slots in the wall 41c. For example, the handle may be turned through 90 degrees from the vertical position shown in Figure 1 to a horizontal position to lock the rod 40 in its forward position, in which position the spring 48 acts to urge the pawl tooth 32 into engageable relation to the ratchet teeth 22a. To release the brakes, the handle 54 is turned back to its normal orientation whereupon spring 60 will retract the pawl 30 to non-ratcheting position shown in Figure 3. In the release position of the assembly, the splines 51 and 52 extend through the corresponding radial slots in the wall portion 41c and the spring 60 is in extended condition as shown in Figure 3.

In Figures 5 and 6, there is illustrated a similar brake lever and bracket assembly, and the same reference numerals have been applied to the corresponding parts in Figures 1 and 5. However, in Figure 5, the manual release mechanism for positioning the pawl 30 comprises a push button 80 carried by the instrument panel 81 of the vehicle. The push button is reciprocable in a tubular housing 82, and is connected with a member 83 slidable in the housing 82 by means of an enlarged diameter end portion 84. The end portion 84 receives a compression spring 85 bottomed at its forward end against the housing 82. The member 83 is also coupled to a member 87 having a flanged end 88 fitting within the enlarged diameter portion 84 of the first member 83 and coupled to a rod 90 by means of a pin 91 to transmit motion of the button 80 to the pawl 30 through ring 91', collar 92 and compression spring 93. The spring 93 abuts against a right angle flange 33 which corresponds to the flange 33 of Figure 2. Thus, when the button 80 is pressed, spring 93 urges the pawl 30 into ratcheting position, and when the button 80 is released the spring 85 returns the button 80 to normal position. Pin means 43 couples the rod 90 to the pawl 30 in the rearward direction, so that spring 85 will normally cause the pawl 30 to assume a non-ratcheting position.

In operation of the assembly of Figures 5 and 6, the pawl 30 is normally out of ratcheting position as illustrated in Figure 5, so that if the brake pedal 19 is depressed and released, the brakes are applied and then released. To operate the assembly as a parking brake, the pedal 19 may be moved forwardly and thereafter the button 80 depressed to move the pawl 30 into ratcheting position shown in Figure 6 and the foot pedal released with the button depressed; or alternatively, the button 80 may be first depressed, the foot pedal 19 thereafter moved to shift the ratchet sector 22 progressively past the pawl 32, and the brake pedal then released to allow the pawl tooth to move into tight engagement with one of the ratchet teeth. After release of the foot pedal, the button 80 may be released since the friction between the ratchet and pawl caused by the tension of the brakes will prevent disengagement thereof by spring 85. Under these circumstances, to release the brakes, it is only necessary to apply slight pressure to the foot pedal 19, relieving the friction between the ratchet sector and pawl and allowing the spring 85 to snap the pawl tooth out of engagement with the ratchet sector, whereupon the lever 10 will return to its initial brake release condition under control of the foot of the operator.

Figures 3 and 6 illustrate a modified ratchet tooth and pawl construction wherein the engagement faces such as 100a of ratchet teeth 109 and 101a of pawl tooth 101 extend at relatively steep angles relative to a radial plane through the pivot 23 for the ratchet sector. In this manner, the teeth 100 and 101 are positively interlocked when foot pressure is released from the foot pedal 19, and the full tension of the brake is allowed to be exerted between the ratchet and pawl teeth 100 and 101. However, the teeth 100 and 101 are released by slight pressure in the forward direction on the brake pedal as in the embodiments of Figures 1 and 5.

There is thus provided in accordance with the present invention a brake applying means having a retaining means for retaining the applying means in an attained brake applying position, wherein the retaining means is normally out of retaining relation to the brake applying means so that if the applying means is actuated by the operator in a sudden emergency, the brakes will automatically release when the operator releases the applying means. In prior art parking brakes, the retaining means is normally in retaining relation to the brake applying means and requires a separate movement by the operator to release. Under these prior art circumstances, if the parking brake is applied during a sudden emergency, the operator tends not to think of the separate release operation, with the result that the brakes are locked in actuated condition and the vehicle is thrown into a skid. The present invention prevents this "panic lock" of the brakes and represents an important advance in this art. The present invention is readily applied to straight pull brake lever assemblies and other parking brake structures for preventing "panic lock" thereof, as will be understood by those skilled in the art from a study of the specific illustrative embodiments herein described.

It will be apparent that many modifications and variations may be effected without departing from the scope of the novel concepts of the present invention.

I claim as my invention:

1. A lever structure comprising bracket means, a lever arm pivotally mounted by said bracket means for swinging movement to apply an actuating force, ratchet and pawl means operably connected between said lever arm and said bracket means for retaining said lever arm in an actuating position to which it is moved when the ratchet and pawl means for said ratchet and pawl means are in engageable relation, control means in one position maintaining said ratchet and pawl means in said engageable relation and in a second position maintaining said ratchet and pawl means out of engageable relation, resilient means arranged to normally maintain said control means in said second position, a member connected to said control means for moving the same to said first position to cause said lever arm to be retained in force applying position to which moved, and means for retaining said control means in said first position, said retaining means being releasable by manipulation of said member, said retaining means comprising self-locking teeth of said ratchet and pawl means which maintain said control means in said first position by friction resulting from the tension on the lever arm.

2. A brake lever structure comprising bracket means for mounting in a vehicle, a lever arm pivotally mounted by said bracket means for swinging movement to apply a brake setting force, a ratchet sector pivotally mounted by said bracket means and swingable with said lever arm, pawl means pivotally mounted by said bracket means for movement between a first position in engageable relation with the ratchet sector and a second position out of engageable relation with said ratchet sector, a control rod reciprocally mounted by said bracket means and operably connected to said pawl means for moving between first and second positions to move said pawl means between its first and second positions, spring means arranged to normally maintain said rod toward its second position to hold said pawl means out of engageable relation to said ratchet sector, and abutment means carried by said rod and engageable with said bracket means by axial shifting of the rod from its second to its first position and slight rotation of the rod to retain the rod in its first position with the ratchet sector and pawl means in engageable relation.

3. A brake lever structure comprising bracket means for mounting in a vehicle, a lever arm pivotally mounted by said bracket means for swinging movement to apply a brake setting force, a ratchet sector pivotally mounted by said bracket means and swingable with said lever arm, pawl means pivotally mounted by said bracket means for movement between a first position in engageable relation with the ratchet sector and a second position out of engageable relation with said ratchet sector, a control rod reciprocally mounted by said bracket means and operably connected to said pawl means for moving between first and second positions to move said pawl means between its first and second positions, and resilient means arranged to normally maintain said rod in its second position to hold said pawl means out of engageable relation to said ratchet sector, said ratchet sector having a series of ratchet teeth and said pawl means having a tooth for engagement with successive ones of said ratchet teeth, the engaging faces of said teeth extending at a substantial angle to a radial plane to provide self-locking between the ratchet teeth and pawl means to lock said lever arm in a brake setting position.

4. A foot operated brake lever structure comprising bracket means for mounting in a vehicle, a lever arm pivotally mounted by said bracket means for swinging movement to apply a brake setting force to the brakes of the vehicle, a ratchet sector having arcuately disposed ratchet teeth pivotally mounted by said bracket means and connected with said lever arm for pivotal movement therewith, a pawl member pivotally connected to said bracket means and depending therefrom adjacent said ratchet teeth and having a tooth projecting therefrom for movement into engageable relation to the ratchet sector teeth for retaining the brake lever in successive angular positions to which moved in the brake setting direction, a reciprocal actuating rod connected to said pawl member, a rigid connection between said rod and said pawl member for requiring movement of said pawl member from a first position with the tooth in engageable relation to the ratchet teeth to a second position with the tooth out of engageable relation to the ratchet teeth, a resilient connection between said rod and said pawl member for urging said pawl member toward said first position as said rod is moved toward said ratchet sector, spring means connected to said bracket means and to said rod and in a state of compression to urge said rod away from said ratchet sector to move said pawl member to second position with the pawl tooth out of engageable relation to the ratchet teeth, and interengagement means carried by said rod and said bracket means for engagement upon movement of the rod toward said ratchet member and slight rotation of said rod.

5. A foot operated brake lever structure comprising bracket means for mounting in a vehicle, a lever arm pivotally mounted by said bracket means for swinging movement to apply a brake setting force to the brakes of the vehicle, a ratchet sector pivotally mounted by said bracket means and connected to said brake lever arm for swinging movement therewith, a pawl member pivotally mounted to said bracket means and depending therefrom and having a tooth disposed for engagement with successive teeth of said ratchet member in a first position of said pawl member and for disposition out of engageable relation to said teeth in a second position of said pawl member, a rod for rigid connection with said pawl member in moving said pawl member from first to second position, and for resiliently urging the pawl member from second position to first position in a first position of the rod, push button means coupled to said rod for depression to move said rod to its first position to urge said pawl member toward its first position, and spring means connected to said push button for urging the push button toward projected position and for urging said rod toward a second position with said pawl member in its second position, the brake tension creating a friction between the pawl tooth and the ratchet tooth with which the pawl tooth is engaged to retain the button in depressed condition when the brake lever is moved to a brake setting position and released, the ratchet and pawl teeth being releasable by exerting a slight pressure on the lever arm in the brake setting direction to allow said spring means to return said rod and pawl member to their second positions.

6. A foot operated brake lever structure comprising bracket means for mounting in a vehicle, a lever arm pivotally mounted by said bracket means for swinging movement to apply a brake setting force to the brakes of the vehicle, a ratchet sector pivotally mounted by said bracket means and connected to said brake lever arm for swinging movement therewith, a pawl member pivotally mounted to said bracket means and depending therefrom and having a tooth disposed for engagement with successive teeth of said ratchet member in a first position of said pawl member and for disposition out of engageable relation to said teeth in a second position of said pawl member, a rod for rigid connection with said pawl member in moving said pawl member from first to second position, and for resiliently urging the pawl member from second position to first position in a first position of the rod, manually operable means coupled to said rod for depression to move said rod to its first position to urge said pawl member toward its first position, and spring means connected to said manually operable means for urging the said means toward projected position and for urging said rod toward a second position with said pawl member in its second position, the brake tension creating a friction between the pawl tooth and the ratchet tooth with which the pawl tooth is engaged to retain the manually operable means in depressed condition and released, the ratchet and pawl teeth being releasable by exerting a slight pressure on the lever arm in the brake setting direction to allow said spring means to return said rod and pawl member to their second positions, said ratchet and pawl teeth having engagement faces extending at a steep angle relative to a radial plane to interlock the teeth by means of the pressure exerted therebetween by the brake tension.

7. A foot operated brake lever structure comprising bracket means for mounting in a vehicle, a lever arm pivotally mounted by said bracket means for swinging movement to apply a brake setting force to the brakes of the vehicle, a ratchet sector having arcuately disposed ratchet teeth and pivotally mounted by said bracket means and connected with said lever arm for pivotal movement therewith, a pawl member pivotally connected to said bracket means adjacent said ratchet teeth and having a tooth projecting therefrom for movement into engageable relation to the ratchet sector teeth for retaining the brake lever in successive angular positions to which moved in the brake setting direction, a reciprocable actuating rod connection to said pawl member, a rigid connection between said rod and said pawl member for requiring movement of said pawl member from a first position with the tooth in engageable relation to the ratchet teeth to a second position with the tooth out of engageable relation to the ratchet teeth, a resilient connection between said rod and said pawl member for urging said pawl member toward said first position when the rod is in pawl engaging position, and interengagement means carried by the rod and the bracket means for retaining the rod in one of its positions.

8. A brake lever structure comprising bracket means for mounting in a vehicle, a foot-operated lever arm pivotally mounted by said bracket means for swinging movement to apply a brake setting force, retaining means mounted for movement with said lever arm, cooperating retaining means carried by said bracket means, said retaining means being operable in a first condition thereof to retain said lever arm in attained brake setting position and being relatively movable to a second condition to release said lever arm, a control member connected to said retaining means for relatively moving the retaining means between said first and second conditions, and depressible button means operatively connected to said control member for actuating the same.

References Cited in the file of this patent

UNITED STATES PATENTS

| Number | Name | Date |
|---|---|---|
| 738,100 | Cuntz | Sept. 1, 1903 |
| 880,034 | McNair | Feb. 25, 1908 |
| 1,178,395 | Gilmartin | Apr. 4, 1916 |
| 2,180,209 | Johnson | Nov. 14, 1939 |
| 2,183,772 | Johnson | Dec. 19, 1939 |
| 2,239,916 | Hunt | Apr. 29, 1941 |
| 2,308,898 | Skareen | Jan. 19, 1943 |
| 2,309,454 | Heller | Jan. 26, 1943 |
| 2,315,962 | Jandus | Apr. 6, 1943 |
| 2,472,442 | Schueler | June 7, 1949 |
| 2,531,130 | Jandus | Nov. 21, 1950 |
| 2,587,725 | Hinsey | Mar. 4, 1952 |
| 2,591,495 | Baldwin | Apr. 1, 1952 |
| 2,694,945 | Jandus | Nov. 23, 1954 |
| 2,835,140 | Cox | May 20, 1958 |